(12) United States Patent
Li et al.

(10) Patent No.: US 12,424,693 B2
(45) Date of Patent: Sep. 23, 2025

(54) ATOMIZATION DEVICE MANUFACTURING METHOD AND ATOMIZATION DEVICE

(71) Applicant: LUXSHARE PRECISION INDUSTRY COMPANY LIMITED, Shenzhen (CN)

(72) Inventors: HuaBing Li, Shenzhen (CN); ZhongYuan Lai, Shenzhen (CN); Yu Huang, Shenzhen (CN); ZheXian Tianzhou, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 501 days.

(21) Appl. No.: 17/845,345

(22) Filed: Jun. 21, 2022

(65) Prior Publication Data
US 2022/0408842 A1 Dec. 29, 2022

(30) Foreign Application Priority Data

Jun. 29, 2021 (CN) .......................... 202110729340.8

(51) Int. Cl.
*H01M 50/247* (2021.01)
*A24F 40/40* (2020.01)
*B05B 5/00* (2006.01)
*H01M 50/202* (2021.01)
*H01M 50/548* (2021.01)
*H01M 50/55* (2021.01)

(52) U.S. Cl.
CPC ........... *H01M 50/247* (2021.01); *B05B 5/001* (2013.01); *H01M 50/202* (2021.01); *H01M 50/548* (2021.01); *H01M 50/55* (2021.01); *A24F 40/40* (2020.01); *H01M 2220/30* (2013.01)

(58) Field of Classification Search
CPC ....... A24B 13/02; A24B 15/12; A24B 15/167; A24B 3/14; A24D 1/002; A24D 1/20; A24F 40/10; A24F 40/20; A24F 40/40; A24F 40/42; A24F 40/46; A24F 40/485; A24F 40/70; A24F 40/44; H01M 2220/30; H01M 50/202; H01M 50/244; H01M 50/247; H01M 50/548; H01M 50/55; H05B 2203/021; H05B 3/42
USPC ......................................................... 392/395
See application file for complete search history.

(56) References Cited

U.S. PATENT DOCUMENTS

| 2014/0290677 A1* | 10/2014 | Liu ....................... A61M 15/06 131/329 |
| 2016/0205999 A1* | 7/2016 | Liu .......................... H05B 3/46 |
| 2018/0020731 A1 | 1/2018 | Rasmussen et al. |

FOREIGN PATENT DOCUMENTS

| CN | 202873797 U | 4/2013 |
| CN | 203492790 U | 3/2014 |

(Continued)

*Primary Examiner* — Sang Y Paik

(57) ABSTRACT

The present disclosure provides an atomization device manufacturing method and an atomization device. The method steps are, firstly obtaining a hollow rod, two ends of which are respectively provided with an opening, secondly assembling an atomization component to the opening at one end of the rod, then assembling a battery component in the rod and electrically connecting the battery component with the atomization component, and finally assembling a sensing component to the opening at the other end of the rod and electrically connecting the sensing component with the battery component.

19 Claims, 12 Drawing Sheets

(56) References Cited

FOREIGN PATENT DOCUMENTS

| | | |
|---|---|---|
| CN | 204120231 U | 1/2015 |
| CN | 204519370 U | 8/2015 |
| CN | 105105340 B | 3/2018 |
| CN | 110558621 A | 12/2019 |
| CN | 210038476 U | 2/2020 |
| CN | 210492823 U | 5/2020 |
| CN | 210520099 U | 5/2020 |
| CN | 212306815 U | 1/2021 |
| CN | 212697677 U | 3/2021 |
| CN | 213188064 U | 5/2021 |
| TW | M605024 U | 12/2020 |
| WO | WO2015/131406 A1 | 9/2015 |

* cited by examiner

ATOMIZATION DEVICE MANUFACTURING METHOD AND ATOMIZATION DEVICE

CROSS-REFERENCE TO RELATED APPLICATION

This application claims the priority benefit of Chinese Patent Application Serial Number 202110729340.8, filed on Jun. 29, 2021, the full disclosure of which is incorporated herein by reference.

BACKGROUND

Technical Field

The present disclosure relates to the technical field of atomization devices, particularly to an atomization device manufacturing method and an atomization device.

Related Art

Conventionally, an atomization device can be used to atomize a specific filler to be inhaled. For example, an electronic cigarette is a type of atomization device, which is an electronic device that simulates a traditional cigarette. An electronic cigarette comprises an atomizer, a tube containing nicotine solution, and a battery, which atomizes the smoke e-liquid in the atomizer to simulate the smoke produced in smoking by the electric current of charged lithium battery. The configuration of conventional electronic cigarettes on the market shows that the battery supplies power to an interface of the atomizer through soldered wires. The manufacturing of this type of electrical configuration is complicated, in which the soldering and assembling require a lot of labor works.

SUMMARY

The embodiments of the present disclosure provide an atomization device manufacturing method and atomization device tended to solve the problem of complicated manufacturing process requiring high labor costs by modular design of configuration for atomization devices.

On the first aspect, the present disclosure provides an atomization device manufacturing method, comprising: Obtaining a hollow rod, two ends of which are respectively provided with an opening. Assembling an atomization component to the opening at one end of the rod. Assembling a battery component in the rod and electrically connecting the battery component with the atomization component. Assembling a sensing component to the opening at the other end of the rod and electrically connecting the sensing component with the battery component.

In one embodiment, the manufacturing methods of the atomization component are: Assembling a liquid guiding member in a heating member. Disposing two conductive members at two ends of the heating member respectively for manufacturing an atomizer. Assembling the atomizer to a base. Assembling one end of a tube to the base, and the tube surrounds the atomizer. Filling a filler into the tube. Sealing the other end of the tube with a suction nozzle member, and the suction nozzle member, and the base secure the atomizer.

In one embodiment, in the step of assembling the liquid guiding member into the heating member, the heating member is a spiral component. The liquid guiding member is inserted into the spiral component.

In one embodiment, in the step of assembling the atomizer to the base, the base comprises a first tube body and a base body. The first tube body is inserted in the base body. The heating member and the liquid guiding member are disposed at a nozzle of the first tube body away from the base body. Two ends of each of the two conductive members respectively are inserted in the base body.

In one embodiment, in the step of securing the atomizer with the suction nozzle member and the base, the suction nozzle member comprises a suction nozzle and a second tube body. The second tube body is inserted in the suction nozzle. One end of the second tube body away from the suction nozzle secures the heating member and the liquid guiding member to the first tube body of the base.

In one embodiment, the steps of electrically connecting the battery component to the atomization component comprise: Assembling a battery to an electrical conductive member, the battery is electrically connected to the atomization component through the electrical conductive member. Securing a sleeve to an outer side of the battery and the electrical conductive member, the sleeve comprises a slit extending from one end to the other end of the sleeve. Pressing the mutually connected battery and the electrical conductive member to enter the sleeve through the slit.

In one embodiment, the manufacturing steps of the battery component are: Assembling the battery to the electrical conductive member, the battery is electrically connected to the atomization component through the electrical conductive member. Securing a sleeve to an outer side of the battery and the electrical conductive member, wherein two opposite ends of the sleeve are respectively provided with a sleeve cover covering an opening at two opposite ends of the sleeve. Opening the sleeve cover and assembling the mutually connected battery and electrical conductive member into the sleeve through the opening to allow the sleeve covers to cover two opposite ends of the electrical conductive member.

On the second aspect, the present disclosure provides an atomization device, comprising a rod, an atomization component, a battery component, and a sensing component. The rod is a hollow cylinder, two ends of which are respectively provided with an opening. The atomization component is disposed at one end of the rod. The battery component is disposed in the rod and is electrically connected with the atomization component. The sensing component is disposed at the other end of the rod and electrically connected with the battery component.

In one embodiment, the atomization component comprises an atomizer, a base, a tube, a filler, and a suction nozzle member. The atomizer is disposed at the base. One end of the tube is disposed at the base. The atomizer is disposed in the tube. The filler is filled in the tube. The suction nozzle member is disposed at the other end of the tube member. The suction nozzle member and the base secure the atomizer.

In one embodiment, the atomizer comprises a heating member, a liquid guiding member, and two conductive members. The liquid guiding member is assembled in the heating member. One ends of the two conductive members are connected to two ends of the heating member. The base comprises a first tube body and a base body. The first tube body is inserted in the base body. The heating member and the liquid guiding member are disposed at a nozzle of the first tube body away from the base body.

In one embodiment, the suction nozzle member comprises a suction nozzle and a second tube body. The second tube body is inserted in the suction nozzle. A nozzle of the second tube body away from the suction nozzle is connected with the nozzle of the first tube body away from the base body. The nozzle of the second tube body away from the suction nozzle and the nozzle of the first tube body away from the base body secure the heating member and the liquid guiding member between the first tube body and the second tube body.

In one embodiment, the nozzle of the first tube body away from the base body comprises a first positioning component. The nozzle of the second tube body away from the suction nozzle comprises a second positioning component. The first positioning component of the first tube body is connected to the second positioning component of the second tube body and forms a securing through hole. The heating member and the liquid guiding member are inserted in the securing through hole.

In one embodiment, each of the conductive members comprises a conductive strip and a conductive pin. The conductive pin is disposed at one end of the conductive strip. The conductive pin is disposed at the base. The conductive pin is exposed from a bottom surface of the base. The other end of the conductive strip is connected with two ends of the heating member.

In one embodiment, the battery component comprises a battery and an electrical conductive member. The electrical conductive member comprises a conductive bracket, a first elastic sheet group, a first contacting bump, a second elastic sheet group, and a second contacting bump. An inner side of a first end of the conductive bracket is provided with the first elastic sheet group. An outer side of the first end of the conductive bracket is provided with the first contacting bump. An inner side of a second end of the conductive bracket is provided with the second elastic sheet group. An outer side of the second end of the conductive bracket is provided with the second contacting bump. Two ends of the battery are electrically connected with the first elastic sheet group and the second elastic sheet group, respectively. The first contacting bump is electrically connected with the conductive pin of the two conductive members.

In one embodiment, one end of the battery, comprising a power terminal and a ground terminal, is electrically connected to the second elastic sheet group.

In one embodiment, one end of the battery, comprising a ground terminal, is electrically connected to the first elastic sheet group. The other end of the battery, comprising a power terminal and another ground terminal, is electrically connected to the first elastic sheet group.

In one embodiment, the battery component further comprises a sleeve comprising an accommodating space. One side surface of the sleeve comprises a slit communicating with the accommodating space. The slit extends from one end of the sleeve to the other end of the sleeve. The battery and the electrical conductive member enter the accommodating space of the sleeve through the slit to be secured.

In one embodiment, the battery component further comprises a sleeve comprising a sleeve body, two connecting bodies, and two sleeve covers. The sleeve body comprises an accommodating space. Two opposite ends of the sleeve body respectively comprise an opening, the accommodating space communicates with the openings at two ends of the sleeve body. The two connecting bodies are extending from one side edge of the openings at two ends of the sleeve body. One side of the two sleeve covers is connected to the two connecting bodies. The two sleeve covers cover the openings at two ends of the sleeve body. Wherein the battery and the electrical conductive member that enter the accommodating space through the opening are secured in the sleeve through the two sleeve covers.

In one embodiment, the electrical conductive member further comprises a contact elastic piece. The contact elastic piece extends from the second elastic sheet group toward the outside of the second end of the conductive bracket and is connected to the sensing component.

In one embodiment, the sensing component comprises a suction nozzle member, an air permeable member, and a sensing member. The suction nozzle member comprises an accommodating groove. The bottom of the accommodating groove is provided with an air suction hole. The air permeable member is disposed in the accommodating groove. The sensing member is disposed at the air permeable member. The sensing member is disposed in the accommodating groove. One end of the sensing member is electrically connected to the battery component.

In the embodiments of the present disclosure, by manufacturing an atomization device with specific methods, the atomization device can be produced by a magazine-type combination of the atomization component, battery component, and the sensing component. Since the assembling method is simple, the manufacturing process can be simplified. A mechanical configuration can further be applied to achieve a simple automatic assembly operation, which improves the manufacturing process efficiency of the atomization device and reduces labor costs.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the members and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of members not only includes these members, but also includes other members not specified expressly, or may include inherent members of the process, method, object, or device. If no more limitations are made, a member limited by "include a/an . . . " does not exclude other same members existing in the process, the method, the article, or the device which includes the member.

Figure 1:
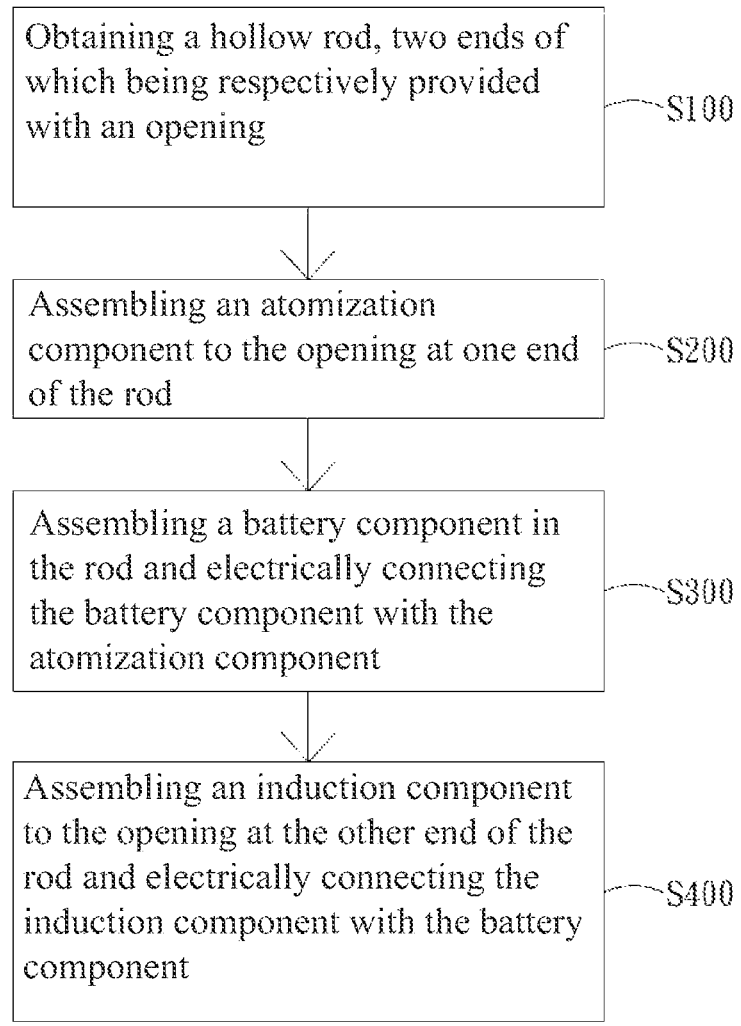
FIG. 1 is a flow chart of a manufacturing method of an atomization device of the present disclosure.
Figure 2:
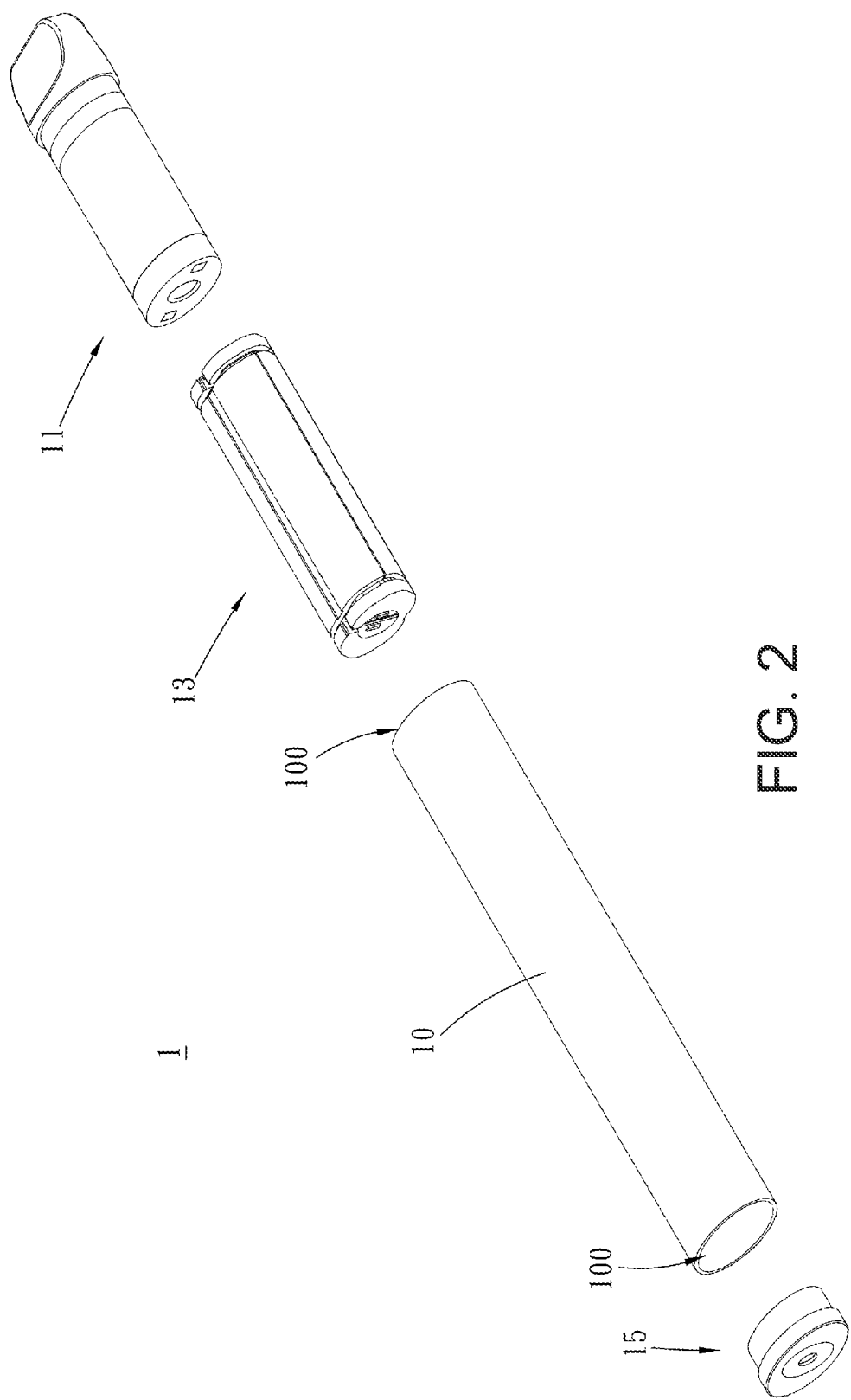
FIG. 2 is an exploded view of the atomization device of the present disclosure.
Figure 3:
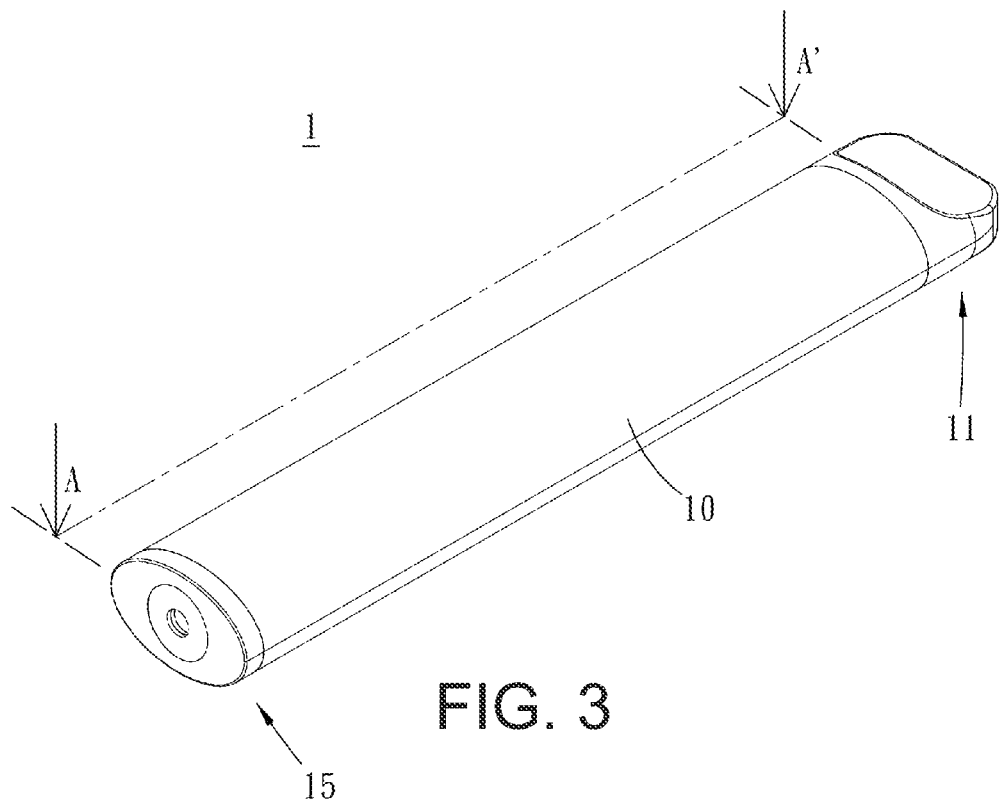
FIG. 3 is a perspective view of the atomization device of the present disclosure.
Figure 4:
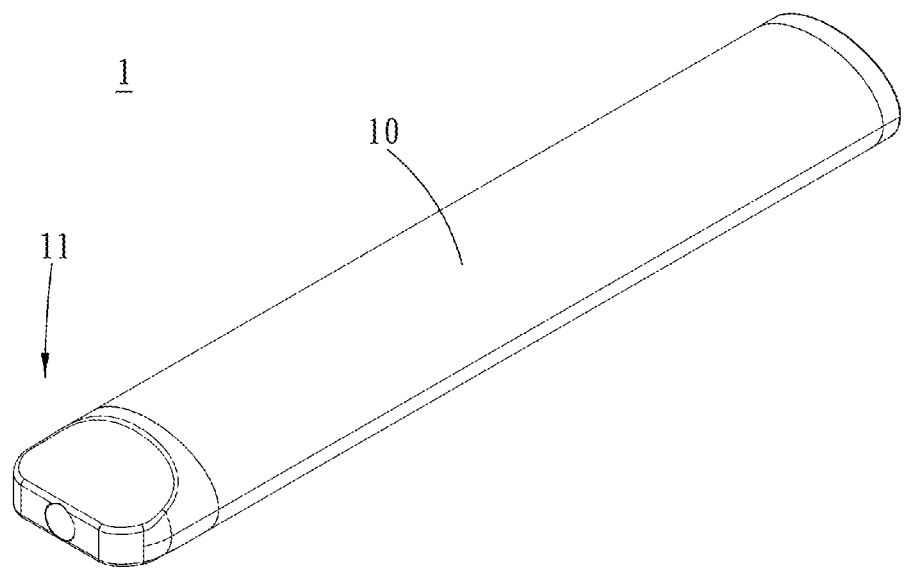
FIG. 4 is another perspective view of the atomization device of the present disclosure.
Figure 5:
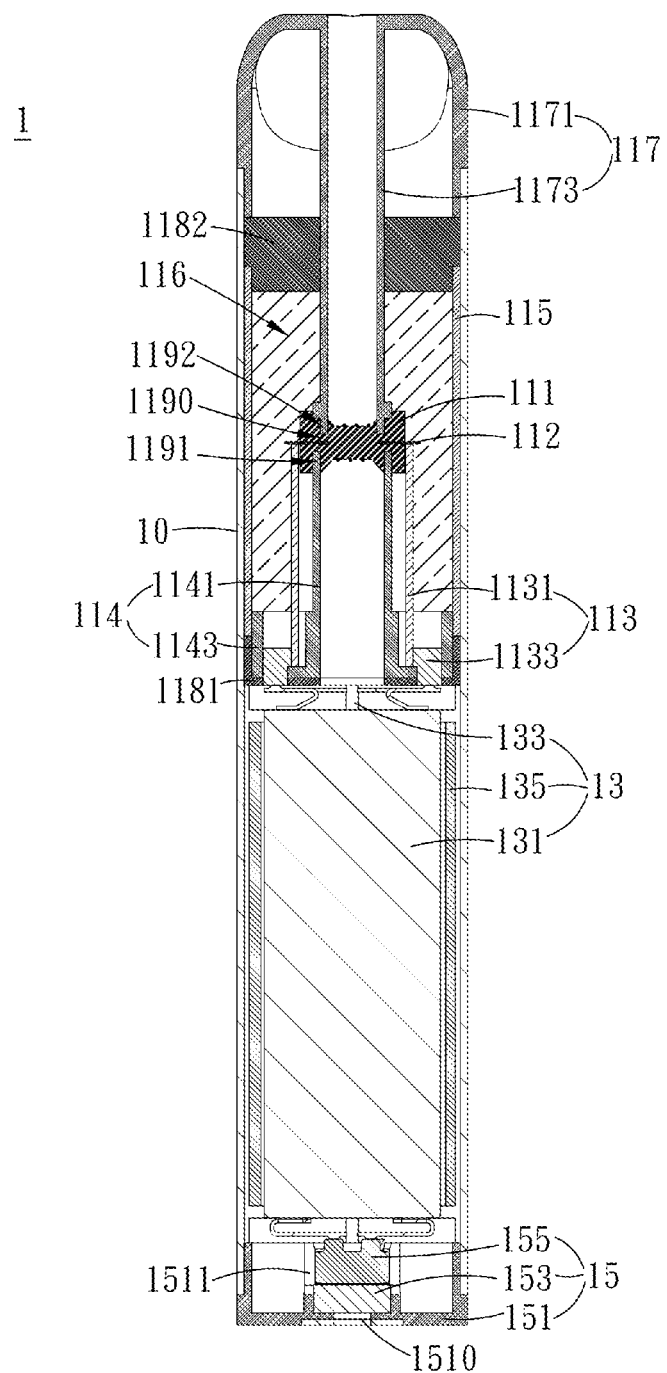
FIG. 5 is a cross-sectional view along line A-A of FIG. 3.

FIG. 1 is a flow chart of a manufacturing method of an atomization device of the present disclosure. FIG. 2 is an exploded view of the atomization device of the present disclosure. FIG. 3 is a perspective view of the atomization device of the present disclosure. FIG. 4 is another perspective view of the atomization device of the present disclosure. FIG. 5 is a cross-sectional view along line A-A' of FIG. 3. As shown in the figures, the present disclosure provides an atomization device manufacturing method, comprising: Step S100: obtaining a hollow rod 10, two ends of which are respectively provided with an opening 100; step S200: assembling an atomization component 11 to the opening 100 at one end of the rod 10; step S300: assembling a battery component 13 in the rod 10 and electrically connecting the battery component 13 with the atomization component 11; step S400: assembling a sensing component 15 to the opening 100 at the other end of the rod 10 and electrically connecting the sensing component 15 with the battery component 13.

In this embodiment, the atomization component 11, the battery component 13, and the sensing component 15 are assembled in the rod 10 in order according to the above methods with buckling, latches, or glue to simplify complicated manufacturing processes. Mechanical type configurations can also be used to perform simple automated assembling operations to improve the process efficiency of the atomization device 1 for a deduction on labor costs. Thus, the production of the atomization device 1 can be completed.

Figure 6:
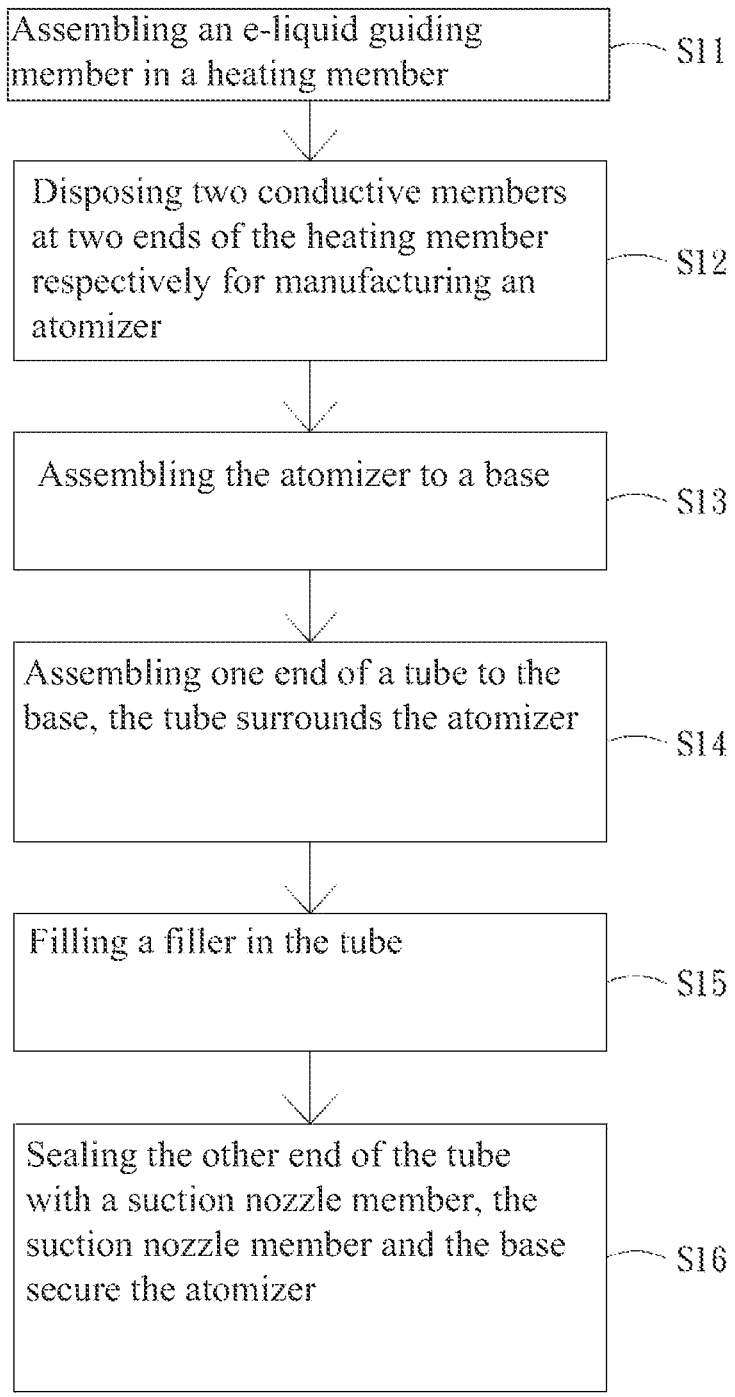
FIG. 6 is a flow chart of a manufacturing method of an atomization component of the present disclosure.
Figure 7:
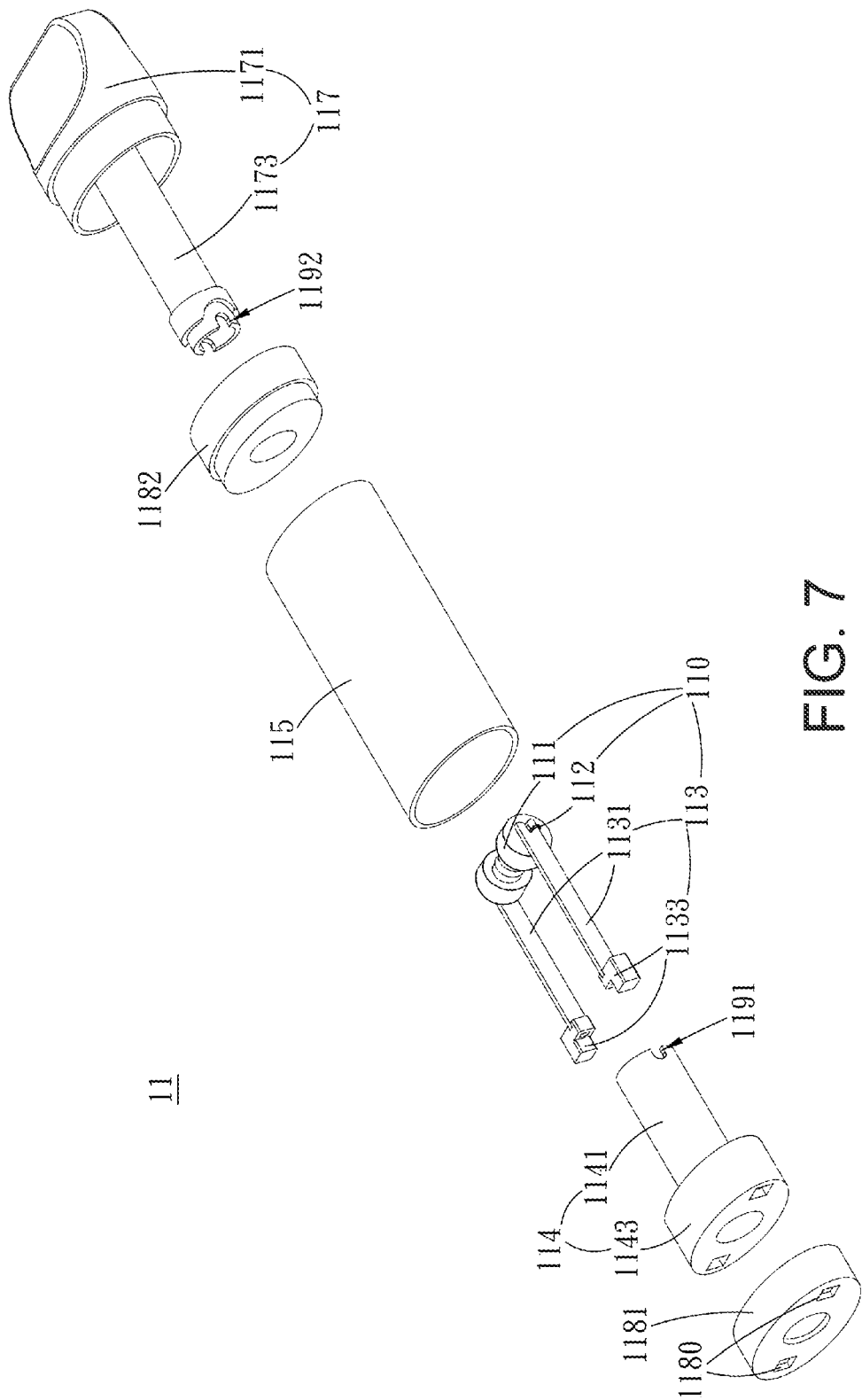
FIG. 7 is an exploded view of the atomization component of the present disclosure.
Figure 8:
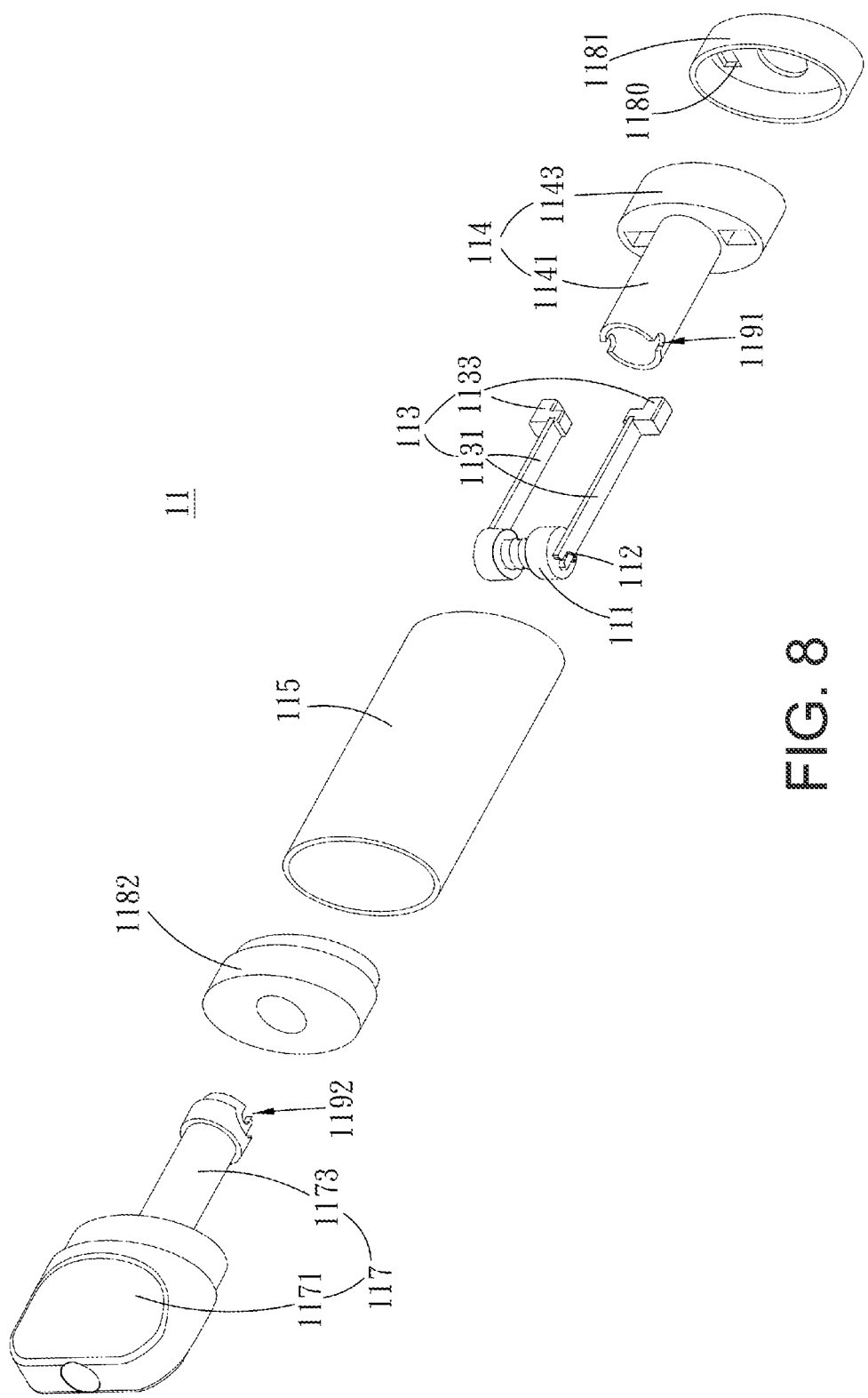
FIG. 8 is another exploded view of the atomization component of the present disclosure.
Figure 9:
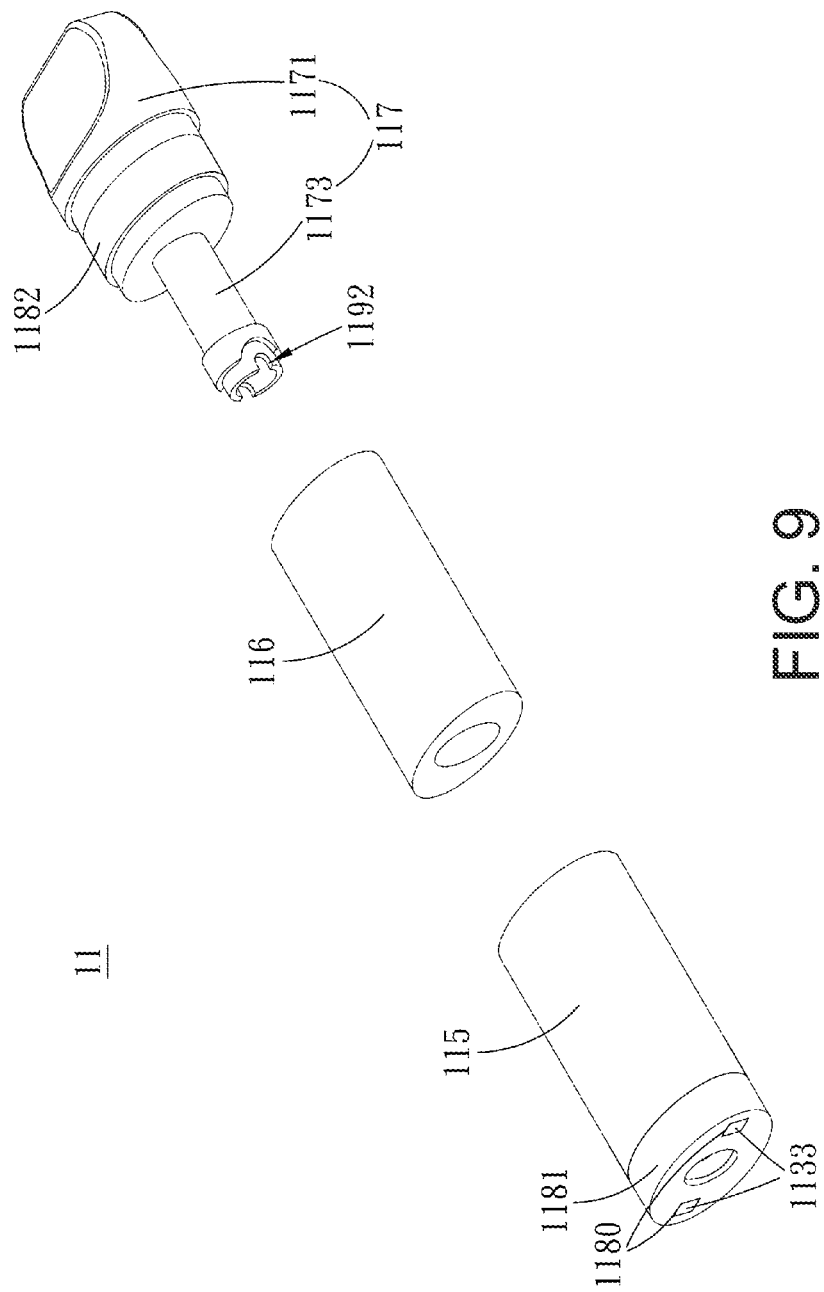
FIG. 9 is a schematic diagram of a filler filling in the atomization component of the present disclosure.

FIG. 6 is a flow chart of a manufacturing method of an atomization component of the present disclosure. FIG. 7 is an exploded view of the atomization component of the present disclosure. FIG. 8 is another exploded view of the atomization component of the present disclosure. FIG. 9 is a schematic diagram of a filler filling in the atomization component of the present disclosure. As shown in the figures, in this embodiment, the manufacturing methods of the atomization component are: Step S11: assembling a liquid guiding member 111 in a heating member 112. Wherein a heating wire is firstly drawn by a wire drawing machine, and then the heating wire is manufactured into a spiral heating member 112 by winding. Moreover, the liquid guiding member 111 is an object that absorbs the liquid such as an liquid guiding cotton. A shaping jig clamps the liquid guiding cotton and is inserted into the spiral heating member 112, and then releases the liquid guiding cotton. The liquid guiding cotton expands and returns to the initial state to stuck in the spiral heating member 112.

The step 12 is to, disposing two conductive members 113 at two ends of the heating member 112 respectively for manufacturing an atomizer 110. Wherein one ends of the two conductive members 113 are secured to two ends of the heating member 112 so that the two conductive members 113 are mutually connected through the heating member 112, and meanwhile to restrict the liquid guiding member 111 to be not prone to fall out of the heating member 112.

The step 13 is to, assembling the atomizer 110 to a base 114. Wherein the base 114 comprises a first tube body 1141 and a base body 1143. The first tube body 1141 is inserted in the base body 1143, which is a silicone plug. During assembling, the assembly machine places the heating member 112 and the liquid guiding member 111 on a nozzle of the first tube body 1141 away from the base body 1143, and have the two ends of the base body 1143 of the two conductive members 113 to be inserted in the base body 1143, respectively. In this way, two ends of the two conductive members 113 are exposed from a bottom surface of the base body 1143.

The step 14 is to, assembling one end of a tube 115 to the base 114, and the tube 115 surrounds the atomizer 110. This indicates that The base body 1143 of the base 114 is disposed at the nozzle of one end of the tube 115. A first sealing member 1181 is further provided, which covers the base body 1143 of the base 114 and seals a gap between the base body 114 and the tube 115. A surface of the first sealing member 1181 comprises an opening 1180, from which two ends of the two conductive members 113 inserted in the base 1143 are exposed. In this way, leakage of a filler 116 described in the follows from the tube 115 can be avoided.

The step 15 is to, filling the filler 116 into the tube. Wherein the filler 116 is a liquid absorbing cotton or liquid. In this embodiment, when the liquid absorbing cotton absorbs the filler, the liquid absorbing cotton would be picked up by a mechanical arm to be filled in the tube 115 to fill the circumference of the atomizer 110.

The step 15 is to, sealing the other end of the tube 115 with a suction nozzle member 117, and the suction nozzle member 117 and the base 114 secure the atomizer 110. Wherein the suction nozzle member 117 comprises a suction nozzle 1171 and a second tube body 1173 inserted in the suction nozzle 1171. One end of the second tube body 1173 away from the suction nozzle 1171 secures the heating member 112 and the liquid guiding member 111 to the first tube body 1173 of the base 114. A second sealing member 1182 is further provided, through which the first tube body 1173 of the suction nozzle member 117 is penetrated to be disposed at the other end of the tube 115. In this way, the second sealing member 1182 can be disposed between the suction nozzle 1171 and the tube 115 to seal the gap between the suction nozzle 1171 and the tube 115 to keep the filler 116 from leaking from the tube 115.

Figure 10:
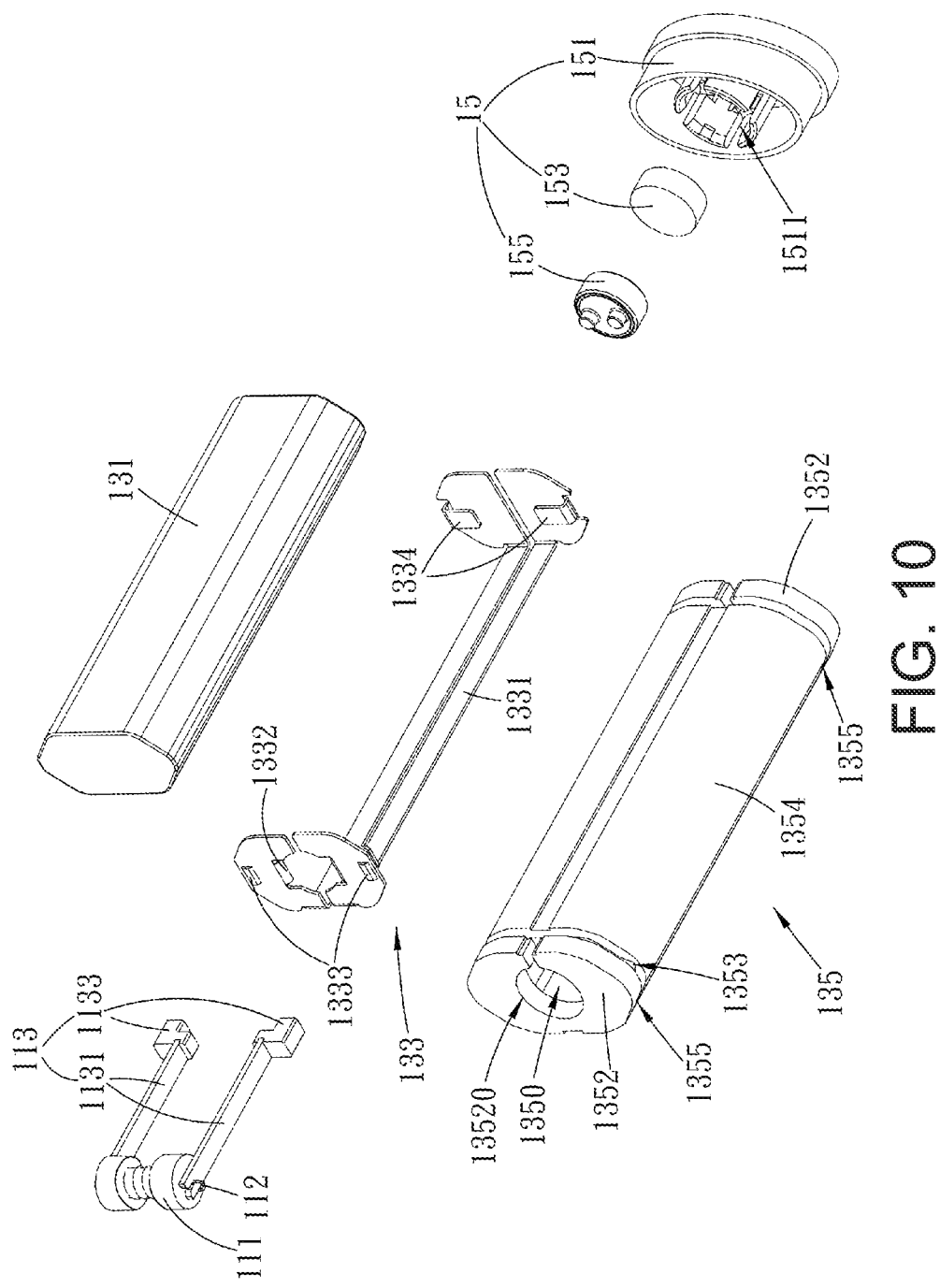
FIG. 10 is an exploded view of an electrical configuration of the atomization device of the present disclosure.
Figure 11:
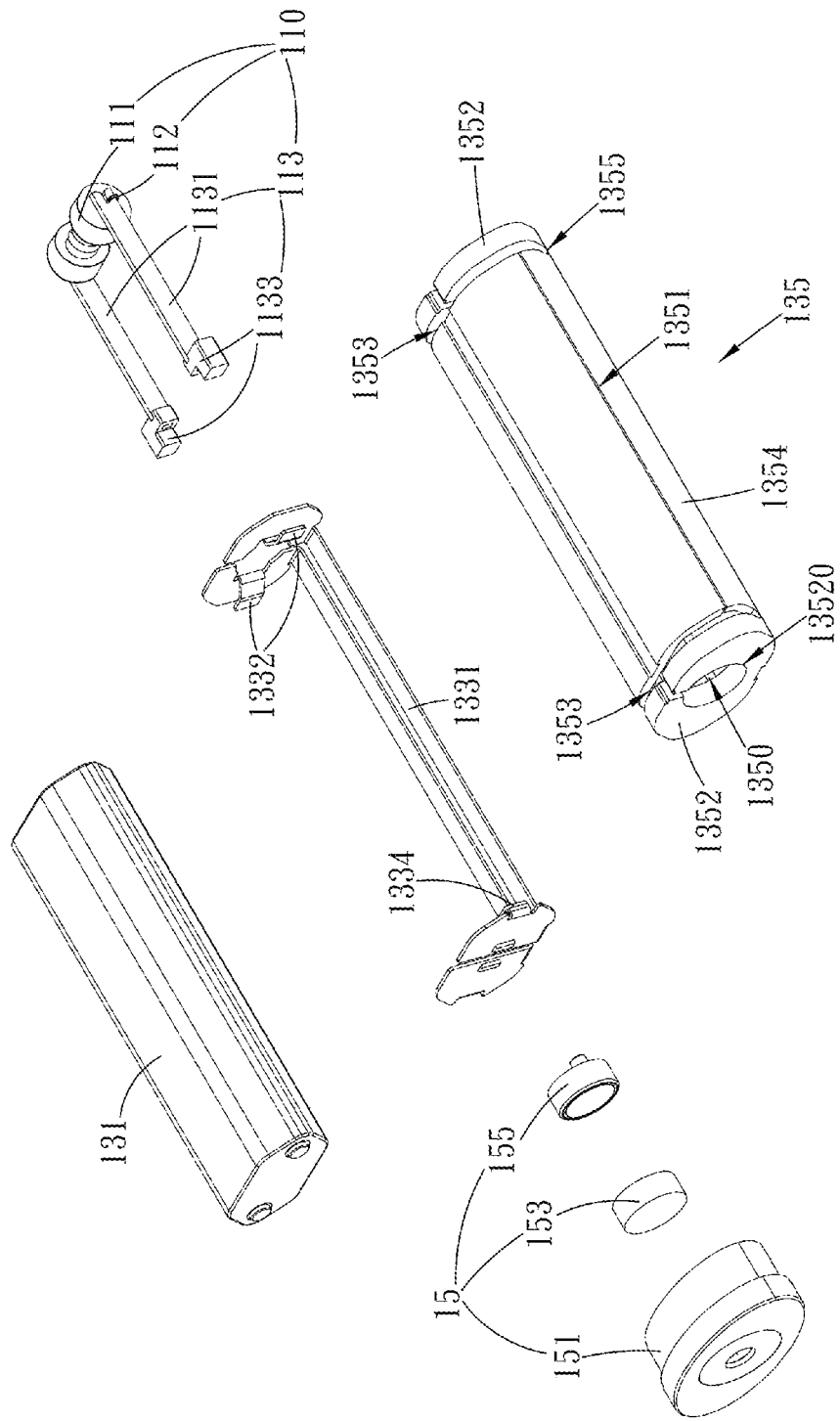
FIG. 11 is another exploded view of an electrical configuration of the atomization device of the present disclosure.

FIG. 10 and FIG. 11 are exploded views of an electrical configuration of the atomization device of the present disclosure. As shown in the figures, in this embodiment, the manufacturing steps of the battery component 13 are: assembling the battery 131 to the electrical conductive member 133, the battery 131 is electrically connected through the electrical conductive member 133. Securing a sleeve 135 to an outer side of the battery 131 and the electrical conductive member 133, so that the electrical connecting position between the battery 131 and the electrical conductive member 133 can be fixed. When the battery component 13 is electrically connected to the atomization component 11, the electrical conductive member 133 can be electrically connected to the two ends of the two conductive members 113.

In some embodiments, the manufacturing steps of the battery component 13 further comprising: assembling the battery 131 to the electrical conductive member 133, the battery 131 is electrically connected to the atomization component 11 through the electrical conductive member 133. Securing a sleeve 135 to an outer side of the battery 131 and the electrical conductive member 133. Wherein the sleeve 135 comprises a slit 1351 extending from one end of the sleeve 135 to the other end. Finally, to pressingly assemble the mutually connected battery 131 and electrical conductive member 133 into the sleeve 135 through the slit 1351.

In another embodiment, the manufacturing steps of the battery component 13 further comprising: assembling the battery 131 to the electrical conductive member 133, the battery 131 is electrically connected to the atomization component 11 through the electrical conductive member 133. Securing a sleeve 135 to an outer side of the battery 131 and the electrical conductive member 133. Wherein two opposite ends of the sleeve 135 are respectively provided with a sleeve cover 1352 covering an opening 1353 at two opposite ends of the sleeve 135. Opening the sleeve cover 1352 and assembling the mutually connected battery 131 and electrical conductive member 133 into the sleeve 135 through the opening 1353 to allow the sleeve covers 1352 to cover two opposite ends of the electrical conductive member 133. Besides, the sleeve cover 1352 further comprises a through hole 13520 used for the exposure of the electrical conductive configuration of the electrical conductive member 133.

In the above embodiment, in the step of securing the sleeve 135 to the outer side of the battery 131 and the electrical conductive member 133, the co-configuration of the battery 131 and the electrical conductive member 133 can be inserted into the slit 1351 of the sleeve 135 or can be inserted into the openings 1353 at two opposite ends of the sleeve 135, followed by covering the openings 1353 at two opposite ends of the sleeve 135 with a sleeve cover 1352. Different ways for components assembled to the sleeve 135 of this embodiment through the slit 1351 or two openings 1353 at two opposite ends can be optionally chosen from.

Besides, the steps for manufacturing a sensing component 15 comprises, obtaining a suction nozzle member 151 comprising an accommodating groove 1511; disposing an air permeable member 153 at the bottom of the accommodating groove 1511, wherein the air permeable member 153 is made of foam. Placing a sensing member 155 on the air permeable member 153, and at the same time, the sensing member 155 is disposed in the accommodating groove 1511. When the sensing component 15 is disposed at the other end of the rod 10, it would be electrically connected to the battery component 13.

Referring to FIG. 3 to FIG. 5 again, in this embodiment, an atomization device 1 is provided, which comprises a rod 10, an atomization component 11, a battery component 13, and a sensing component 15. The rod 10 extends in a longitudinal direction and is a hollow cylinder whose two opposite ends respectively comprise an opening 100. The atomization component 11 is disposed at the opening 100 of one end of the rod 10. The battery component 13 is disposed in the rod 10 and is electrically connected to the atomization component 11. The sensing component 15 is disposed at the opening 100 of the other end of the rod 10 and is electrically connected to the battery component 13. Wherein the rod 10 is made of aluminum alloy, and the suction nozzle 1171 of the suction nozzle member 117 is made of plastic.

Referring to FIG. 7 and FIG. 8 again, the atomization component 11 comprises an atomizer 110, a base 114, a tube 115, a filler 116, and a suction nozzle member 117. The atomizer 110 is disposed at the base 114. The atomizer 110 comprises a liquid guiding member 111, a heating member 112, and two conductive members 113 disposed in the heating member 112. One ends of the two conductive members 113 are connected to two ends of the heating member 112. Besides, the conductive member 113 comprises a conductive strip 1131 and a conductive pin 1133. One end of the conductive strip 1131 is connected to the two ends of the heating member 112. The conductive pin 1133 is disposed at the other end of the conductive strip 1131. The conductive pin 1133 is disposed at the base 114 and is exposed from a bottom surface of the base 114. One end of the tube 115 is disposed at the base 114. In the tube 115 the atomizer 110 is disposed and the filler 116 is filled. The suction nozzle member 117 is disposed at the other end of the tube 115. The suction nozzle member 117 and the base 114 secure the atomizer 110.

The base 114 comprises a first tube body 1141 and a base body 1143, in which the first tube body 1141 is inserted. The heating member 112 and the liquid guiding member 111 are disposed at the nozzle of the first tube body 1141 away from the base body 1143. Besides, the suction nozzle member 117 comprises a suction nozzle 1171 and a second tube body 1173 inserted in the suction nozzle 1171 so that the nozzle of the second tube body 1173 is exposed from a surface of the suction nozzle 1171. The nozzle of the second tube body 1173 away from the suction nozzle 1171 is communicating with the nozzle of the first tube body 1141 away from the base body 1143, allowing the heating member 112 and the liquid guiding member 111 to be secured between the first tube body 1141 and the second tube body 1173. Wherein the nozzle of the first tube body 1141 away from the base body 1143 comprises a first positioning component 1191, and the nozzle of the second tube body 1173 away from the suction nozzle 1171 comprises a second positioning component 1192. The first positioning component 1191 of the first tube body 1141 and the second positioning component 1192 of the second tube body 1173 are connected to form a securing through hole 1190 (see FIG. 5). The heating member 112 and the liquid guiding member 111 are inserted in the securing through hole 1190. The liquid guiding member 111 seals the orifice of the securing through hole 1190, so that the filler 116 would not directly flow into the first tube body 1141 and the second tube body 1173.

Figure 12:
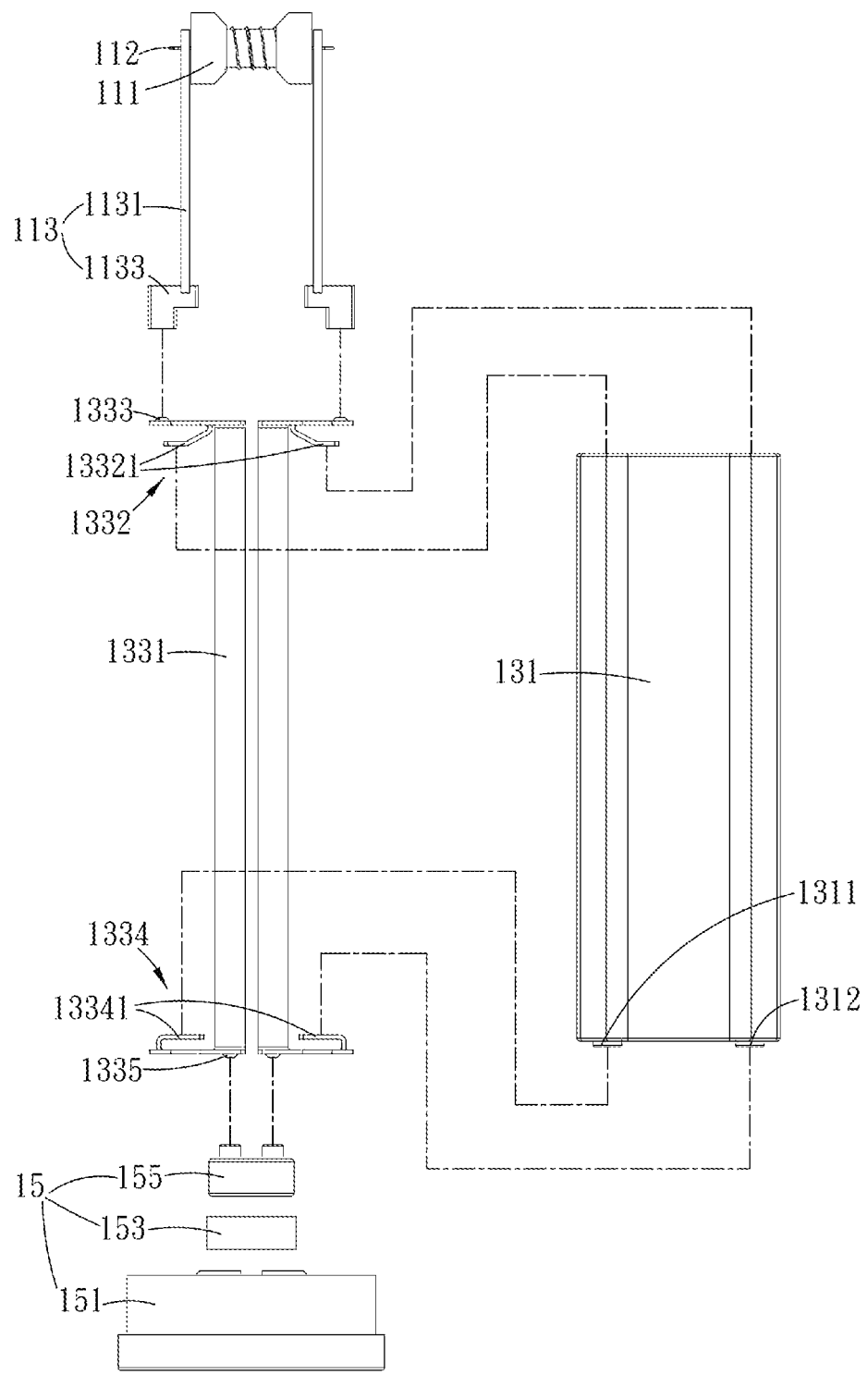
FIG. 12 is a schematic diagram of an electrical configuration of the atomization device of the first embodiment of the present disclosure.

FIG. 12 is a schematic diagram of an electrical configuration of the atomization device of the first embodiment of the present disclosure. Referring to FIG. 10 to FIG. 12, as shown in the figures, in this embodiment, the battery component 13 comprises a battery 131 and an electrical conductive member 133. The electrical conductive member 133 comprises a conductive bracket 1331, a first elastic sheet group 1332, a first contacting bump 1333, a second elastic sheet group 1334, and a second contacting bump 1335. The oppositely disposed first end and the second end of the conductive bracket 1331 are respectively disposed at two opposite ends of the battery 131. The conductive bracket 1331 is extending between the first end and second end thereof. An inner side of the first end of the conductive bracket 1331 is provided with a first elastic sheet group 1332, and an outer side of the first end of the conductive bracket 1331 is provided with a first contacting bump 1333. An inner side of the second end of the conductive bracket 1331 is provided with a second elastic sheet group 1334, and an outer side of the second end of the conductive bracket 1331 is provided with a second contacting bump 1335. Two ends of the battery 131 are electrically connected with the first elastic sheet group 1332 and the second elastic sheet group 1334. The first contacting bump 1333 is electrically connected with the conductive pin 1133 of the two conductive members 113. Besides, the battery component 13 comprises a sleeve 135, which is secured to the outside of the electrical conductive member 133. The sleeve 135 secures the electrical connecting position of the electrical conductive member 133 and the battery 131. Wherein the sleeve 135 is made of silicone.

In some embodiment, the battery component 13 further comprises a sleeve 135, which comprises an accommodating space 1350. A side surface of the sleeve 135 comprises a slit 1351 communicating with the accommodating space 1350. The slit 1351 extends from one end of the sleeve 135 to the other end of the sleeve 135. The battery 131 and the electrical conductive member 133 enter the accommodating space 1350 in the sleeve 135 through the slit 1351 for securing.

In some other embodiments, the battery component 13 further comprises a sleeve 135, which comprises a sleeve body 1354, two connecting bodies 1355, and two sleeve covers 1352. The sleeve body 1354 comprises an accommodating space 1350, and two opposite ends of the sleeve body 1354 respectively comprise an opening 1353. The accommodating space 1350 is communicating with the openings 1353 at two ends. One side edges of the openings 1353 at two ends of the sleeve body 1354 respectively extend to be two connecting bodies 1355. One side of the two sleeve covers 1352 is connected with the two connecting bodies 1355. The two sleeve covers 1352 cover the openings 1353 at two ends of the sleeve body 1354. In this way, when the two sleeve covers 1352 can be opened relative to the sleeve body 1354, the sleeve covers 1352 could be away from the opening 1353 of the sleeve body 1354. The openings 1353 at two ends of the sleeve body 1354 can be exposed to the outside. Wherein the battery 131 and the electrical conductive member 133 enter the accommodating space 1350 through the opening 1353. When the battery 131 and the electrical conductive member 133 are assembled into the sleeve 135, the cover 1352 would be restored to cover a part of the first elastic sheet group 1332 and the second elastic sheet group 1334. In this way, the battery 131 and the electrical conductive member 133 in the sleeve 135 can be secured by the two sleeve covers 1352. Besides, the sleeve cover 1352 comprises a through hole 13520 for the exposure of the first elastic sheet group 1332 and the second elastic sheet group 1334 of the electrical conductive member 133, and thereby for the battery component 13 to be electrically connected to the atomization component 11 and the sensing component 15.

In the above embodiment, the sleeve 135 is secured on the outer side of the battery 131 and the electrical conductive member 133. Wherein the co-configuration of the battery 131 and the electrical conductive member 133 can be inserted into the slit 1351 of the sleeve 135, or inserted into the openings 1353 at the two opposite ends of the sleeve 135, followed by covering the openings 1353 at two opposite ends of the sleeve 135 with the sleeve cover 1352. In this embodiment, the sleeve 135 can comprise both the slit 1351 and the opening 1353 at two opposite ends of the sleeve 135 for users to select the way to assemble the battery 131 and the electrical conductive member 133.

Referring to FIG. 12 again, in this embodiment, the battery 131 is configured as a single-sided two-terminal battery. The battery 131 comprises a power terminal 1311 and a ground terminal 1312 electrically connected to the second elastic sheet group 1334. Wherein the second elastic sheet group 1334 comprises two second elastic sheets 13341, which are electrically connected to the power terminal 1311 and the ground terminal 1312, respectively. The first elastic sheet group 1332 comprises two first elastic sheets 13321. The two first elastic sheets 13321 are pressed to be secured to an end surface of one end of the battery 131.

In this embodiment, the description of electric current supply circuit of the single-sided two-terminal battery 131 is as follows. Firstly, when the sensing member 155 of the sensing component 15 receives a sensing signal, the sensing member 155 would drive the battery component 13 to supply power. Then the power terminal 1311 of the battery 131 outputs electric current to the second elastic sheet 13341, and the electric current is transmitted from the second elastic sheet 13341 to the conductive bracket 1331 then from the conductive bracket 1331 to the first contacting bump 1333, and from the first contacting bump 1333 to the atomizer 110. Wherein when the output electric current from the first contacting bump 33 passes through the conductive pin 1133, the conductive strip 1131, the heating member 112, the other conductive strip 1131, and the other conductive pin 1133, it would be transmitted back to the ground terminal 1312 starting from the other first contacting bump 1333 through the conductive bracket 1331 then the other second elastic sheet 13341, thereby completing a current loop.

Figure 13:
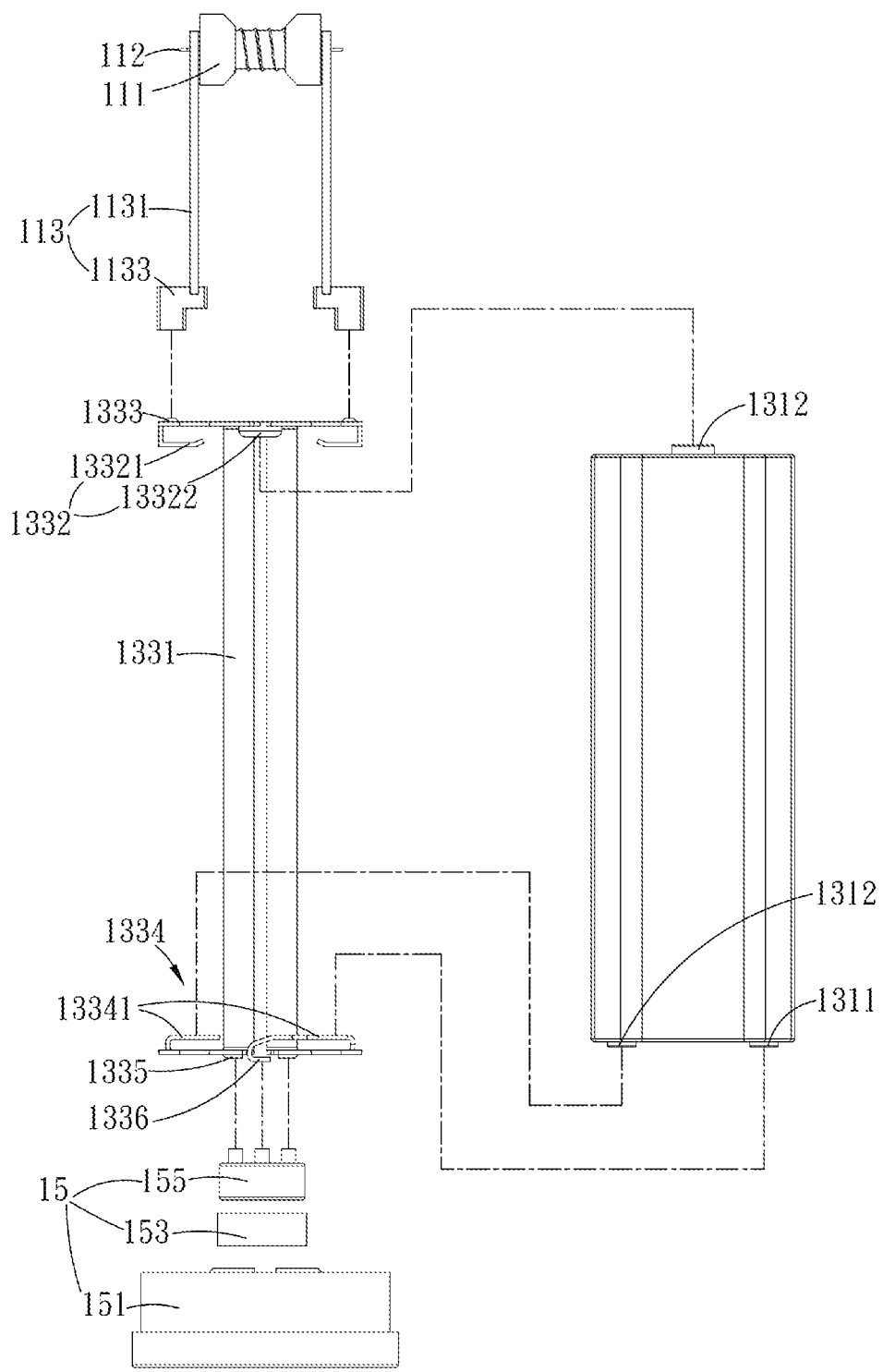
FIG. 13 is a schematic diagram of an electrical configuration of the atomization device of the second embodiment of the present disclosure.

FIG. 13 is a schematic diagram of an electrical configuration of the atomization device of the second embodiment of the present disclosure. As shown in the figure, in this embodiment, the battery 131 is configured as a double-sided three-terminal battery. The battery 131 comprises a power terminal 1311 and two ground terminals 1312. One end of the battery 131 comprises the ground terminal 1312, which is electrically connected with a first elastic sheet group 1332. Wherein the first elastic sheet group 1332 comprises two first elastic sheets 13321 and an electrical connecting end 13322. The electrical connecting end 13322 is disposed between the two first elastic sheets 13321. A ground terminal 1312 is electrically connected with the electrical connecting end 13322. The two first elastic sheets 13321 are abutting against and secured to an end surface of one end of the battery 131. The other end of the battery 131 comprises a power terminal 1311 and another ground terminal 1312. The power terminal 1311 and the other ground terminal 1312 are electrically connected to a second elastic sheet group 1334. Wherein the second elastic sheet group 1334 comprises two second elastic sheets 13341, which are electrically connected to the power terminal 1311 and the other ground terminal 1312, respectively. In this embodiment, the linear connection distance of the circuit can be shortened by the ground terminal 1312 of one end of the battery 131. That is, by shortening the path distance of electric current, electric resistance could be reduced to cut off the power loss and the waste heat generation.

In this embodiment, the difference between the power supply current loop of the double-sided three-terminal battery 131 and that of the single-sided two-terminal battery 131 is that the electric current is directly conducted to the ground terminal 1312 through the conductive bracket 1331 and the electrical connecting end 13322 when the electric current is transmitted through the atomizer 110 via the first contacting bump 1333 and returns to the other first contacting bump 1333. In this way, the circuit loop path distance can be significantly shortened for the completion of a complete current loop.

Besides, the electrical conductive member 133 further comprises a contact elastic piece 1336, which extends from the second elastic sheet 13341 of the second elastic sheet group 1334 to the outer side of the second end of the conductive bracket 1331 to be electrically connected to the sensing member 155 of the sensing component 15. Wherein the contact elastic piece 1336 is electrically connected to a control unit in the sensing member 155 of the sensing component 15 for real time detection of the electric current power intensity and maintaining the dynamic adjustment.

Referring to FIG. 10 and FIG. 11 again, the sensing component 15 comprises a suction nozzle member 151, an air permeable member 153, and a sensing member 155. The suction nozzle member 151 comprises an accommodating groove 1511. The bottom of the accommodating groove 1511 is provided with a suction hole 1510, that is, the suction hole 1510 penetrates the suction nozzle member 151. The air permeable member 153 is disposed in the accommodating groove 1511. The sensing member 155 is disposed on the air permeable member 153 and is disposed in the accommodating groove 1511. One end of the sensing member 155 is electrically connected to the battery component 13. Wherein the sensing member 155 comprises an airstream sensing unit and a control unit. When the control unit receives a sensing signal from the airstream sensing unit, the control unit would send a control signal to control the power supply intensity or the cutoff of the power supply of the battery component 13.

Referring to FIG. 5 again, in this embodiment, when the atomization device 1 is been using, the second tube body 1173 of the suction nozzle 1171 would attract the air in the rod 10, so that the suction hole 1510 of the suction nozzle member 151 can guide the air of the outer atmosphere into the rod 10. When the airstream sensing unit of the sensing member 155 of the suction nozzle member 151 senses the ingress of air, the control unit of the sensing member 155 would control the battery 131 to supply power. The battery 131 supplies power to the two conductive members 113 of the atomizer 110 through the electrical conductive member 133. When the conductive member 113 conducts electric current to the heating member 112, the heating member 112 would generate high heat to heat up the filler 116 adsorbed by the liquid guiding member 111 with evaporating the filler 116 into a smoke. When the filler 116 in smoke is inhaled through the second tube body 1173 of the suction nozzle member 117, e-smoking can be completed with the atomization device 1.

Besides, when the filler 116 in the atomization component 11 is fully consumed, it can be refilled into the atomization component 11, or the atomization component 11 can be replaced with a new one for further smoking with the atomization device 1.

In summary, embodiments of the present disclosure provide an atomization device manufacturing method and an atomization device. By manufacturing an atomization device with specific methods, the atomization device can be produced by a magazine-type combination of the atomization component, battery component, and the sensing component. Since the assembling method is simple, the manufacturing process can be simplified. A mechanical configuration can further be applied to achieve a simple automatic assembly operation, which improves the manufacturing process efficiency of the atomization device and reduces labor costs.

It is to be understood that the term "comprises", "comprising", or any other variants thereof, is intended to encompass a non-exclusive inclusion, such that a process, method, article, or device of a series of members not only comprise those members but further comprises other members that are not explicitly listed, or members that are inherent to such a process, method, article, or device. A member defined by the phrase "comprising a . . . " does not exclude the presence of the same member in the process, method, article, or device that comprises the member.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A method for manufacturing an atomization device, comprising:
    obtaining a hollow rod, two ends of which being respectively provided with openings;
    assembling an atomization component to the opening at one of the ends of the rod;
    assembling a battery component in the rod and electrically connecting the battery component with the atomization component; and
    assembling a sensing component to the opening at the other one of the ends of the rod and electrically connecting the sensing component with the battery component;
    wherein the manufacturing steps of the battery component comprises:
    assembling a battery to an electrical conductive member, the battery being electrically connected to the atomization component through the electrical conductive member;

securing a sleeve to an outer side of the battery and the electrical conductive member, the sleeve comprising a slit extending from one end to an another end of the sleeve; and pressing the assembly of the battery and the electrical conductive member to enter the sleeve through the slit.

2. The method for manufacturing an atomization device according to claim 1, wherein the manufacturing methods of the atomization component comprises:

assembling a liquid guiding member in a heating member;

disposing two conductive members at two ends of the heating member respectively for manufacturing an atomizer;

assembling the atomizer to a base;

assembling one end of a tube to the base, the tube surrounding the atomizer;

filling a filler in the tube;

sealing an another end of the tube with a suction nozzle member, the suction nozzle member and the base securing the atomizer.

3. The method for manufacturing an atomization device according to claim 2, wherein in the step of assembling the liquid guiding member into the heating member, the heating member is a spiral component; the liquid guiding member is inserted into the spiral component.

4. The method for manufacturing an atomization device according to claim 2, wherein in the step of assembling the atomizer to the base, the base comprises a first tube body and a base body; the first tube body is inserted in the base body; the heating member and the liquid guiding member are disposed at a nozzle of the first tube body away from the base body; two ends of each of the two conductive members respectively are inserted in the base body.

5. The method for manufacturing an atomization device according to claim 4, wherein in the step of securing the atomizer with the suction nozzle member and the base, the suction nozzle member comprises a suction nozzle and a second tube body; the second tube body is inserted in the suction nozzle; one end of the second tube body away from the suction nozzle secures the heating member and the liquid guiding member to the first tube body of the base.

6. The method for manufacturing an atomization device according to claim 1, wherein the manufacturing steps of the battery component comprises:

assembling the battery to the electrical conductive member, the battery being electrically connected to the atomization component through the electrical conductive member; and securing a sleeve to an outer side of the battery and the electrical conductive member, wherein two opposite ends of the sleeve are respectively provided with sleeve covers covering openings at two opposite ends of the sleeve; and opening the sleeve cover and assembling the assembly of the battery and the electrical conductive member into the sleeve through the opening to allow the sleeve covers to cover two opposite ends of the electrical conductive member.

7. An atomization device, comprising:

a rod being a hollow cylinder, two ends of which being respectively provided with openings;

an atomization component disposed at one of the ends of the rod;

a battery component disposed in the rod and electrically connected with the atomization component; and a sensing component disposed at the other one of the ends of the rod and electrically connected with the battery component;

wherein the battery component comprises:

an electrical conductive member;

a battery assembled to the electrical conductive member and electrically connected to the atomization component through the electrical conductive member; and a sleeve secured to an outer side of the battery and the electrical conductive member and comprising a slit extending from one end to another end of the sleeve;

wherein the assembly of the battery and the electrical conductive member is configured to be pressed to enter the sleeve through the slit.

8. The atomization device according to claim 7, wherein the atomization component comprises an atomizer, a base, a tube, a filler, and a suction nozzle member; the atomizer is disposed at the base; one end of the tube is disposed at the base; the atomizer is disposed in the tube; the filler is filled in the tube; the suction nozzle member is disposed at an another end of the tube member; the suction nozzle member and the base secure the atomizer.

9. The atomization device according to claim 8, wherein the atomizer comprises a heating member, a liquid guiding member, and two conductive members; the liquid guiding member is assembled in the heating member; one ends of the two conductive members are connected to two ends of the heating member; the base comprises a first tube body and a base body; the first tube body is inserted in the base body; the heating member and the liquid guiding member are disposed at a nozzle of the first tube body away from the base body.

10. The atomization device according to claim 9, wherein the suction nozzle member comprises a suction nozzle and a second tube body; the second tube body is inserted in the suction nozzle; a nozzle of the second tube body away from the suction nozzle is connected with the nozzle of the first tube body away from the base body; the nozzle of the second tube body away from the suction nozzle and the nozzle of the first tube body away from the base body secure the heating member and the liquid guiding member between the first tube body and the second tube body.

11. The atomization device according to claim 10, wherein the nozzle of the first tube body away from the base body comprises a first positioning component; the nozzle of the second tube body away from the suction nozzle comprises a second positioning component;

the first positioning component of the first tube body is connected to the second positioning component of the second tube body and forms a securing through hole; the heating member and the liquid guiding member are inserted in the securing through hole.

12. The atomization device according to claim 9, wherein each of the conductive members comprises a conductive strip and a conductive pin; the conductive pin is disposed at one end of the conductive strip; the conductive pin is disposed at the base; the conductive pin is exposed from a bottom surface of the base; an another end of the conductive strip is connected with two ends of the heating member.

13. The atomization device according to claim 12, wherein the electrical conductive member comprises a conductive bracket, a first elastic sheet group, a first contacting bump, a second elastic sheet group, and a second contacting bump; an inner side of a first end of the conductive bracket is provided with the first elastic sheet group; an outer side of the first end of the conductive bracket is provided with the first contacting bump; an inner side of a second end of the conductive bracket is provided with the second elastic sheet group;

an outer side of the second end of the conductive bracket is provided with the second contacting bump; two ends of the battery are electrically connected with the first elastic sheet group and the second elastic sheet group, respectively; the first contacting bump is electrically connected with the conductive pin of the two conductive members.

14. The atomization device according to claim 13, wherein one end of the battery comprises a power terminal and a ground terminal and is electrically connected to the second elastic sheet group.

15. The atomization device according to claim 13, wherein one end of the battery comprises a ground terminal and is electrically connected to the first elastic sheet group; an another end of the battery comprises a power terminal and an another ground terminal and is electrically connected to the second elastic sheet group.

16. The atomization device according to claim 13, wherein the sleeve comprises an accommodating space;

one side surface of the sleeve comprises the slit communicating with the accommodating space; the battery and the electrical conductive member enter the accommodating space of the sleeve through the slit to be secured.

17. The atomization device according to claim 13, wherein the sleeve comprises a sleeve body, two connecting bodies, and two sleeve covers; the sleeve body comprises an accommodating space;

two opposite ends of the sleeve body respectively comprise an opening; the accommodating space communicates with the openings at two ends of the sleeve body; the two connecting bodies extend from side edges of the openings at two ends of the sleeve body; sides of the two sleeve covers are connected to the two connecting bodies; the two sleeve covers cover the openings at two ends of the sleeve body; wherein the battery and the electrical conductive member that enter the accommodating space through the opening are secured in the sleeve through the two sleeve covers.

18. The atomization device according to claim 13, wherein the electrical conductive member further comprises a contact elastic piece; the contact elastic piece extends from the second elastic sheet group toward the outside of the second end of the conductive bracket and is connected to the sensing component.

19. The atomization device according to claim 7, wherein the sensing component comprises a suction nozzle member, an air permeable member, and a sensing member; the suction nozzle member comprises an accommodating groove; the bottom of the accommodating groove is provided with an air suction hole; the air permeable member is disposed in the accommodating groove; the sensing member is disposed on the air permeable member; the sensing member is disposed in the accommodating groove; one end of the sensing member is electrically connected to the battery component.

* * * * *